(12) United States Patent
Shepelev

(10) Patent No.: US 11,188,161 B2
(45) Date of Patent: Nov. 30, 2021

(54) AUTOMATIVE KNOB SENSING DEVICE

(71) Applicant: SYNAPTICS INCORPORATED, San Jose, CA (US)

(72) Inventor: Petr Shepelev, Campbell, CA (US)

(73) Assignee: Synaptics Incorporated, San Jose, CA (US)

( * ) Notice: Subject to any disclaimer, the term of this patent is extended or adjusted under 35 U.S.C. 154(b) by 157 days.

(21) Appl. No.: 16/546,005

(22) Filed: Aug. 20, 2019

(65) Prior Publication Data

US 2021/0055806 A1 Feb. 25, 2021

(51) Int. Cl.
*G06F 3/0362* (2013.01)
*B60K 37/06* (2006.01)

(52) U.S. Cl.
CPC ............ *G06F 3/0362* (2013.01); *B60K 37/06* (2013.01); *B60K 2370/1434* (2019.05)

(58) Field of Classification Search
CPC ..... G06F 3/0393; G06F 3/0362; B60K 37/06; B60K 2370/141; B60K 2370/1434; B60K 2370/1438; B60K 2370/126
See application file for complete search history.

(56) References Cited

U.S. PATENT DOCUMENTS

| | | | |
|---|---|---|---|
| 9,417,738 B2 | 8/2016 | Hargreaves et al. | |
| 2008/0303772 A1 | 12/2008 | Ruckmongathan | |
| 2009/0309869 A1 | 12/2009 | Umeda | |
| 2013/0120258 A1 | 5/2013 | Maus | |
| 2017/0316901 A1* | 11/2017 | Sawada | H01H 15/06 |
| 2019/0164706 A1* | 5/2019 | Totori | H01H 19/585 |
| 2019/0337389 A1* | 11/2019 | Barvesten | B60R 11/0264 |
| 2020/0019263 A1* | 1/2020 | Korherr | G01D 5/142 |

FOREIGN PATENT DOCUMENTS

KR 20050122688 A 12/2005

* cited by examiner

*Primary Examiner* — Priyank J Shah
(74) *Attorney, Agent, or Firm* — Leydig, Voit & Mayer, Ltd.

(57) ABSTRACT

An electronic device includes a rotatable interface configured to be placed on an input device, the rotatable interface including a conductor region and an adjacent patterned region. The rotatable device further includes a first set of coupling electrodes configured to be electrically coupled to the conductor region and to receive a reference signal from a first electrode of the input device, and a second set of coupling electrodes configured to be electrically coupled to the patterned region and to be electrically coupled to a second electrode of the input device, the second electrode configured to receive a resulting signal modified by the rotatable interface. In embodiments, at least a portion of each electrode of the first set of coupling electrodes and the second set of coupling electrodes is respectively provided underneath the conductor and patterned regions, and is configured to abut the input device.

19 Claims, 13 Drawing Sheets

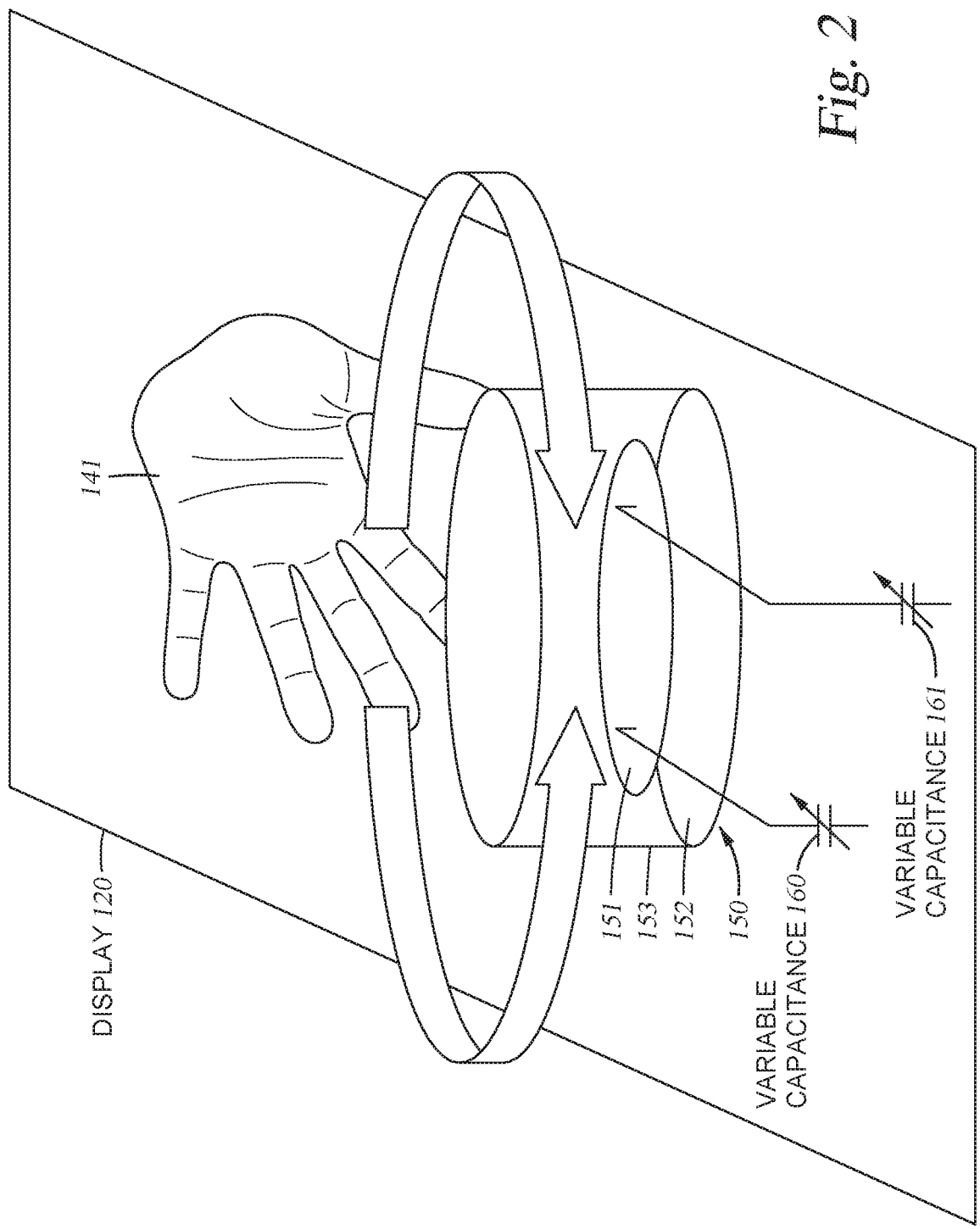

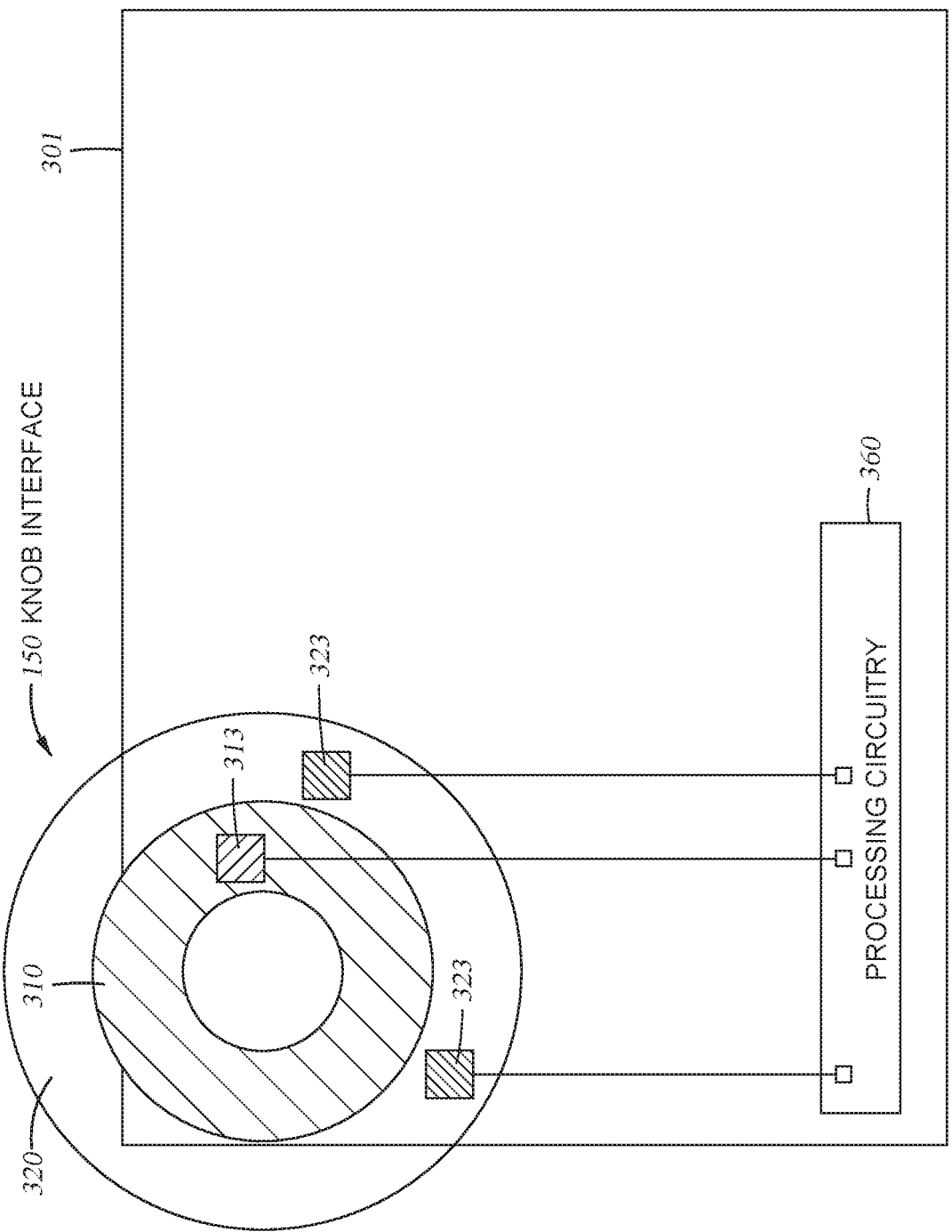

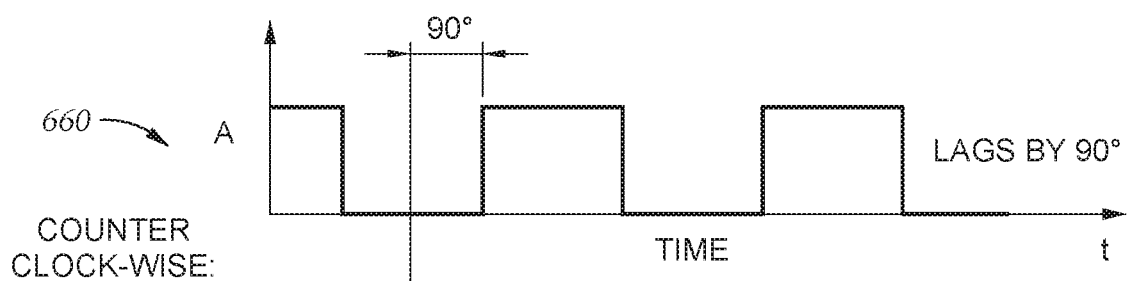
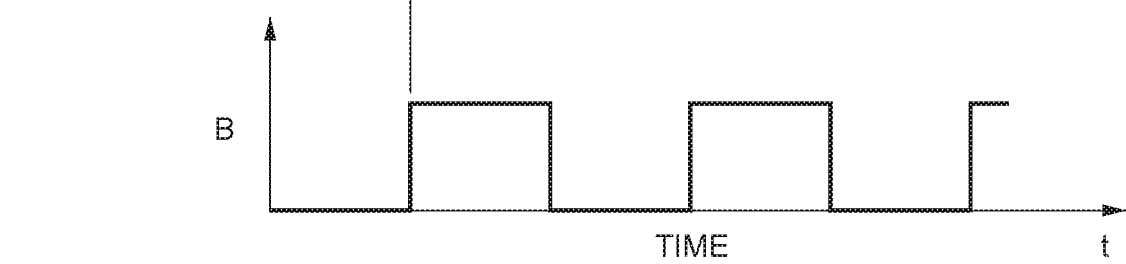
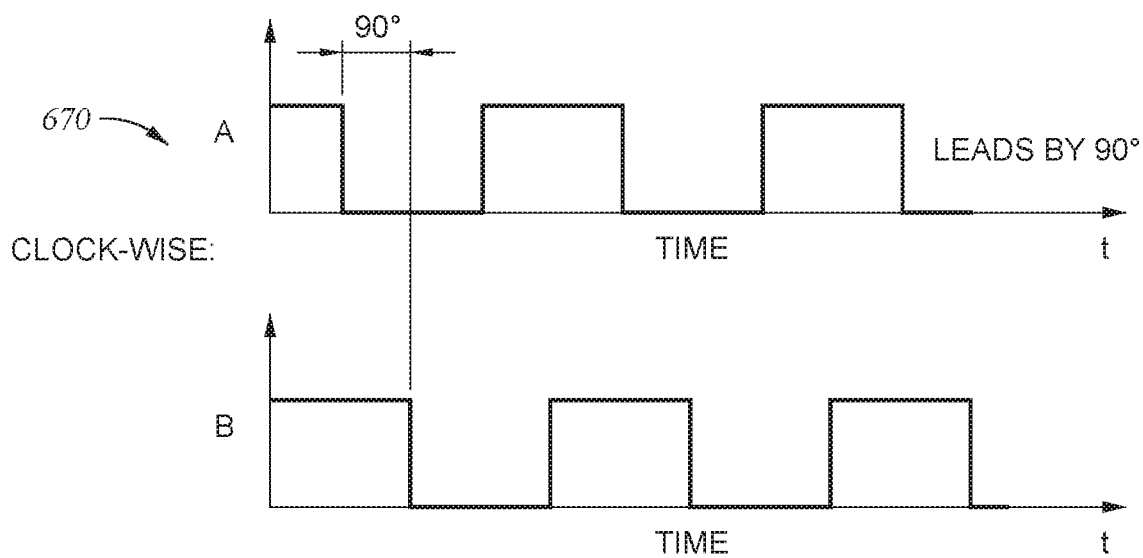
*Fig. 6B*

AUTOMATIVE KNOB SENSING DEVICE

TECHNICAL FIELD

Embodiments of disclosure generally relate to electronic devices.

BACKGROUND

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook or desktop computers. Proximity sensor devices may also often be used in smaller computing systems, such as touch screens integrated in cellular phones. Additionally, proximity sensor devices may be implemented as part of a multi-media entertainment system of an automobile. In such cases, it is useful to interface a knob to a proximity sensor device.

SUMMARY

In one embodiment, an electronic device includes a rotatable interface configured to be placed on an input device, the rotatable interface including a conductor region and an adjacent patterned region. The rotatable interface further includes a first set of coupling electrodes configured to be electrically coupled to the conductor region and to receive a reference signal from a first electrode of the input device, and a second set of coupling electrodes configured to be electrically coupled to the patterned region and to be electrically coupled to a second electrode of the input device, the second electrode configured to receive a resulting signal modified by the rotatable interface. In embodiments, at least a portion of each electrode of the first set of coupling electrodes and the second set of coupling electrodes is respectively provided underneath the conductor and patterned regions, and is configured to abut the input device.

In another embodiment, a sensing system includes an input device and a rotatable device. The input device includes a display panel, processing circuitry, a reference electrode, and a sensing electrode. The rotatable device is configured to be placed on the display panel, and includes a conductor region and an adjacent patterned region, a first set of coupling electrodes configured to be electrically coupled to the conductor region and to receive a reference signal from the reference electrode, and a second set of coupling electrodes configured to be electrically coupled to the patterned region and to the sensing electrode, the sensing electrode configured to receive a resulting signal modified by the rotatable device. In embodiments, at least a portion of each electrode of the first set of coupling electrodes and the second set of coupling electrodes is respectively provided underneath the conductor and patterned regions, and is configured to abut the input device.

In yet another embodiment, a method of processing signals from an input device having a rotational interface, the rotational interface having a conductor region and a patterned region, includes providing a reference signal to a first electrode of the input device that is electrically coupled to the conductor region, and receiving a resulting signal on one or more second electrodes of the input device that are each electrically coupled to the patterned region, each resulting signal modified by the rotational interface. The method further includes determining a rotational position of the rotational interface based, at least in part, on the resulting signal. In such embodiments, the rotational interface is provided on top of a display screen of the input device.

In some embodiments of the method, the patterned region of the rotational interface includes N tracks, and receiving the resulting signal includes receiving M resulting signals on each of M respective second electrodes of the input device each track of the patterned region being coupled to one or more of the M second electrodes, where N and M are each integers greater than zero.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only some embodiments of this disclosure and are therefore not to be considered limiting of its scope, for the disclosure may admit to other equally effective embodiments.

FIG. 2 illustrates capacitive coupling of an example rotatable knob interface with each of a user and an example input device.

FIG. 3 illustrates a top view of an example rotatable knob interface showing example couplings of electrodes of an input device, according to one or more embodiments.

FIG. 6B illustrates example signals received on sensing electrodes of the rotatable knob interface of FIG. 6A and their interpretation, according to one or more embodiments.

Figure 1:
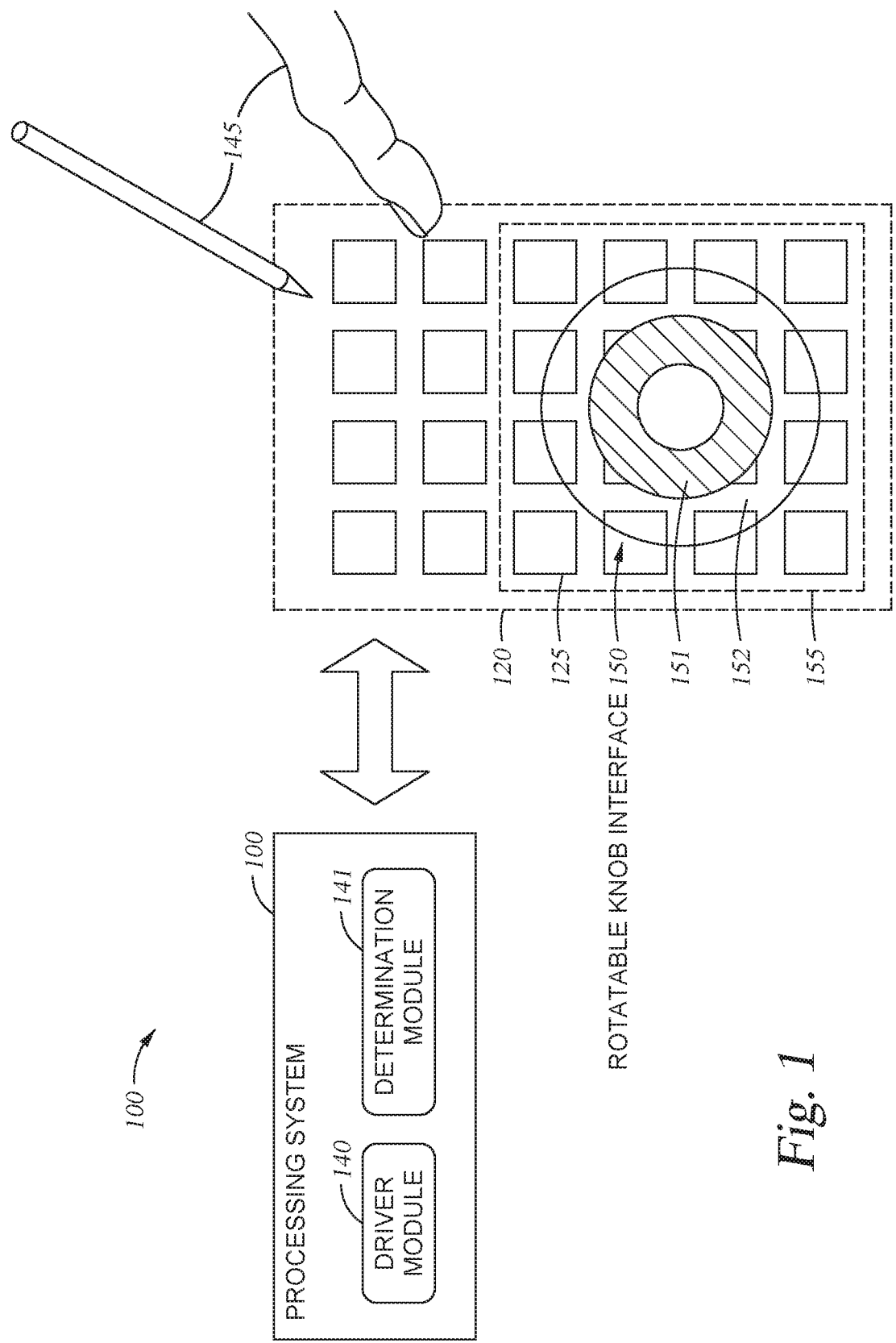
FIG. 1 illustrates an example input device with a rotatable knob interface, according to one or more embodiments.

To facilitate understanding, identical reference numerals have been used, where possible, to designate identical elements that are common to the Figures. It is contemplated that elements disclosed in one embodiment may be beneficially utilized on other embodiments without specific recitation. The drawings should not be understood as being drawn to scale unless specifically noted. Also, the drawings may be simplified and details or components omitted for clarity of presentation and explanation. The drawings and discussion serve to explain principles discussed below, where like designations denote like elements.

DETAILED DESCRIPTION

FIG. 1 is a block diagram of an exemplary electronic device 100, in accordance with embodiments of the disclosure. The electronic device 100 may be configured to provide input to an electronic system (not shown), and/or to update one or more devices. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include electronic device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device. In other embodiments, the electronics system may part of an automobile, and the electronic device 100 represents one or more sensing devices of the automobile. In one embodiment, an automobile may include multiple electronic devices 100, where each electronic device 100 may be configured differently than the other.

The electronic device 100 can be implemented as a physical part of the electronic system, or can be physically separate from the electronic system. As appropriate, the electronic device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In one or more embodiments, the electronic device 100 may utilize any combination of sensor components and sensing technologies to detect user input. For example, as illustrated in FIG. 1, the electronic device 100 comprises one or more electrodes 125 that may be driven to detect objects or update one or more devices. In one embodiment, the electrodes 125 are sensor electrodes of a capacitive sensing device. In such embodiments, electrodes 125 include one or more common voltage electrodes. In other embodiments, the electrodes 125 are electrodes of an image sensing device, radar sensing device, and ultrasonic sensing device. Further yet, the electrodes 125 may be display electrodes of a display device. In embodiments where the electrodes 125 of the electronic device 100 are comprised of the common electrodes and have a common shape, the electronic device 100 may be referred to as including an Advanced Matrix Pad (AMP) technology. Some of the examples described herein include an AMP input device. As described in detail below, electronic device 100 may be provided with a knob interface 150, which may interact with some or all of electrodes 125.

The sensor electrodes 125 may have any shape, size and/or orientation. For example, the sensor electrodes 125 may be arranged in a two-dimensional array as illustrated in FIG. 1. Each of the sensor electrodes 125 may be substantially rectangular in shape. In other embodiments, the sensor electrodes 125 may have other shapes. Further, each of the sensor electrodes 125 may have the same shape and/or size. In other embodiments, at least one sensor electrode may have a different shape and/or size than another sensor electrode. In various embodiments, the sensor electrodes 125 may be diamond shaped, have interdigitated fingers to increase field coupling, and/or have floating cut-outs inside to reduce stray capacitance to nearby electrical conductors.

In embodiments, some capacitive implementations utilize "self-capacitance" (or "absolute capacitance") sensing methods based on changes in the capacitive coupling between sensor electrodes and an input object. In various embodiments, an input object near the sensor electrodes, such as, for example, finger or stylus 145, alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage, or modulated with reference to the transmitter sensor electrodes to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

Capacitive sensing devices may be used for detecting input objects in proximity to and/or touching input devices. Further, capacitive sensing devices may be used to sense features of a fingerprint. Still further, as in the example of FIG. 1, in one or more embodiments, capacitive sensing devices may be provided with a rotatable knob interface that is electrically coupled to the capacitive sensing device, and may be used to sense the rotary positon of the rotary knob. In some embodiments that include the rotatable knob interface, the rotatable knob interface may have a home position and a compressed position, and the sensing device may also be used to determine when the rotatable knob is in the home position, and when it is in the compressed position, based on a change in capacitive coupling of one or more of electrodes 125.

Continuing with reference to FIG. 1, a processing system 110 is shown as part of the electronic device 100. The processing system 110 is configured to operate hardware of the electronic device 100. As illustrated in FIG. 1, processing system 110 comprises a driver module 140, which may include a signal generator. In one or more embodiments, the driver module 140 generates sensing signals with which to drive electrodes 125. In various embodiments, the processing system 110 comprises parts of or all of one or more integrated circuits (ICs) and/or other circuitry components.

In some embodiments, the processing system 110 also comprises electronically-readable instructions, such as firmware code, software code, and/or the like. In some embodiments, components composing the processing system 110 are located together, such as, for example, near sensing element(s) of the electronic device 100. In other embodiments, components of processing system 110 are physically separate with one or more components close to the sensing element(s) of electronic device 100, and one or more components elsewhere. For example, the electronic device 100 may be a peripheral coupled to a desktop computer, and the processing system 110 may comprise software configured to run on a central processing unit (CPU) of the desktop computer and one or more integrated circuits (ICs) (perhaps with associated firmware) separate from the CPU. As another example, the electronic device 100 may be physically integrated in a phone, and the processing system 110 may comprise circuits and firmware that are part of a main processor of the phone. Further yet, the processing system 110 may be implemented within an automobile, and the processing system 110 may comprise circuits and firmware that are part of one or more of the electronic control units (ECUs) of the automobile. In some embodiments, the processing system 110 is dedicated to implementing the electronic device 100. In other embodiments, the processing system 110 also performs other functions, such as operating display screens, driving haptic actuators, etc.

The processing system 110 may be implemented as one or more modules that handle different functions of the processing system 110 (e.g., driver module 140, or determination module 141). Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes. In some embodiments, processing system 100 may be implemented as a chip, or as one or more chips. In some embodiments, processing system 100 may comprise a controller, or a portion of a controller, of electronic device 100.

In one or more embodiments, a display driver (e.g., driver module 140) may be configured for both display updating and input sensing, and may, for example, be referred to as including touch and display driver integration (TDDI) technology. In such embodiments, driver module 140 may be implemented as a TDDI chip, or a portion of a TDDI chip. In one or more embodiments, the electronic device may be an AMP device, and may also include TDDI technology.

In one or more embodiments, the processing system 110 further includes determination module 141. In one or more embodiments, the determination module 141 may be configured to determine changes in a capacitive coupling between each modulated sensor electrode and an input object, such as input objects 145, from the resulting signals. In one embodiment, all of sensor electrodes 125 may be simultaneously operated for absolute capacitive sensing, such that a different resulting signal is simultaneously received from each of the sensor electrodes or a common resulting signal from two or more sensor electrodes. In another embodiment, some of the sensor electrodes 125 may be operated for absolute capacitive sensing during a first period and others of the sensor electrodes 125 may be operated for absolute capacitive sensing during a second period that is non-overlapping with the first period.

In some embodiments, the processing system 110 responds to user input (or lack of user input) directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions. Further, in some embodiments, the processing system 110 is configured to identify one or more target objects, and the distance to the target objects. In some embodiments the processing system 110 is configured to identify one or more rotational changes of knob interface 150, or one or more changes of state of knob interface 150, or both, and map those changes to desired actions.

For example, in some embodiments, the processing system 110 operates electrodes 125 to produce electrical signals (resulting signals) indicative of input (or lack of input) in a sensing region. The processing system 110 may perform any appropriate amount of processing on the electrical signals in producing the information provided to the electronic system. For example, the processing system 110 may digitize analog electrical signals obtained from the electrodes 125. As another example, the processing system 110 may perform filtering or other signal conditioning, or, as yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, recognize fingerprint information, distance to a target object, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

It should be understood that while many embodiments of the disclosure are described in the context of a fully functioning apparatus, the mechanisms of the present disclosure are capable of being distributed as a program product (e.g., software) in a variety of forms. For example, the mechanisms of the present disclosure may be implemented and distributed as a software program on information bearing media that are readable by electronic processors (e.g., non-transitory computer-readable and/or recordable/writable information bearing media readable by the processing system 110). Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

In one or more embodiments, the processing system 110 is configured to generate a voltage signal to drive the electrodes 125 during a display update interval and an input sensing interval, respectively. In such embodiments, the voltage signal generated to drive the electrodes 125 during a display update interval is a substantially constant, or fixed voltage, and the voltage signal generated to drive the electrodes 125 during an input sensing interval may be referred to as a sensing signal, having a waveform with a periodically variable voltage. In one or more embodiments, the value of a voltage signal to drive the electrodes 125 during a display update interval may be predetermined. For example, the voltage value may be provided by a manufacturer of electronic device 100 and/or the electrodes 125, and may be device-specific to electronic device 100.

In one embodiment, the driver module 140 comprises circuitry configured to provide the sensing signal. For example, the driver module circuitry may include an oscillator, one or more current conveyers and/or a digital signal generator circuit. In one embodiment, the driver module circuitry generates the voltage signal based on a clock signal, the output of oscillator and the parameters discussed above.

As noted above, in one or more embodiments, the driver module 140 generates a signal to drive the electrodes 125 during each of display update periods and input sensing update periods. In such embodiments, an input sensing update period is provided in between two display update periods, and is of a shorter duration than a display update period. In such embodiments, there are several display update periods and input sensing update periods per display frame. In one or more embodiments, by acquiring the resulting signals over successive input sensing periods the rotation of the rotatable knob interface 150, as well as whether it is in its home state or compressed, may be tracked.

As noted above, in one or more embodiments, an additional input apparatus may be provided on top of the display panel 120 of the electronic device 100, such as, for example, the rotatable knob interface 150, and may be electrically coupled to some or all of electrodes 125 that lie near or below it. In one or more embodiments, the additional apparatus may provide alternate ways for a user to provide input to electronic device 100 other than touching, or hovering near, a display screen with a finger or stylus. In the depicted example of FIG. 1, the rotatable knob interface 150 is mounted onto the display panel 120, and may have a partial (as shown) or full (not shown) overlap with the display panel 120. As noted, in one or more embodiments the rotatable knob interface 150 may have two regions. The first conducting region 151 that includes a conductor (shaded inner ring in FIG. 1), and the second patterned region 152 (transparent outer ring in FIG. 1). Although in the example of the rotatable knob interface 150 of FIG. 1 the conducting region 151 is an inner region, surrounded by the outer patterned region 152, this is one of many possible examples, and alternate configurations and relative placements of the conducting and patterned regions of the rotatable knob interface are possible, all being within the scope of this disclosure.

It is noted that details of example patterns that may be used in the patterned region 152 are described below with reference to FIGS. 6A, 7A and 7B. In one or more embodiments, the rotation imparted to the rotatable knob interface by a user, in either relative or absolute terms, may be detected by the electronic device 100. In one or more embodiments, the rotatable knob interface 150 may also be pressed downwards by a user, and may thus have two positions, a home, or "uncompressed" position at a first specified distance above the display 120, and a "compressed" position, at a second specified distance above the display 120 which a user maintains by pushing down on the knob interface 150 against a biasing spring, and then holds the knob interface 150 against the top surface of the display panel 120. IN some embodiments the second specified distance may be zero, and the rotatable knob interface 150 thus touching the display 120. In one or more embodiments, direction and degree of rotation, as well as a user pressing down on, or ceasing to press down upon, the rotatable knob interface 150, may be interpreted by processing system 110, such as, for example, by determination module 141, and may be mapped to various user input actions, signals, or directives.

It is noted that in one or more embodiments a user may rotate the rotatable knob interface in various ways. In embodiments these include, for example, grabbing an outer housing of the rotatable knob interface and turning it, grabbing a top of the rotatable knob interface, or a flange protruding from the side of the rotatable knob interface and turning it, or, for example, placing one or more fingertips in or on a recessed channel on an upper surface of the rotatable knob interface.

In one or more embodiments, the electronic device 100 of FIG. 1 may be provided in an automobile. In some embodiments, all other forms of user input besides via the rotatable knob interface 150 may be disabled on the electronic device. Thus, in such embodiments, the electrodes 125 are not driven during the sensing interval to perform their standard sensing functionality. As a result, if a finger or other object 145 is moved into, or away from, their vicinity, no resulting signal is obtained, or if obtained, it is not processed. In embodiments, this may be done to prevent a driver of the automobile from attempting to touch the display 120 while driving, as a safety measure, and thus to only interact with the electronic device 100 via the rotatable knob interface 150. In some embodiments, the disabling of standard sensing functionality of the electrodes 125 may be implemented during specified activities of the automobile, but not during others. For example, the disabling of standard sensing functionality of the electrodes 125 may be implemented while the automobile is in actual motion, but at all other times some of the electrodes 125, e.g., those not near enough to the rotatable knob interface to interfere with signals acquired from it, may be operated to perform standard sensing, as described above.

Thus, in embodiments, when all of the electrodes 125 are disabled from standard sensing, whether during actual driving of the automobile, or whether at all times, as the case may be, the only way that a driver of the automobile can provide input to the electronic device 100 is via the rotatable knob interface 150, using a pre-defined set of rotations and/or pressings of the rotatable knob interface 150. These motions modify a resulting signal which is received by the electronic device 100 during a sensing period, which then interprets them, such as, for example, using determination module 141. It is noted that the resulting signal is the same signal as the sensing signal that driver module 140 drives an electrode 125 with, after being modified by the capacitive coupling of the rotary knob interface 150.

In alternate embodiments, for example, only some of the electrodes 125, in particular those that are near or beneath the rotary knob interface 150, are disabled from standard capacitive sensing, and the remainder of the electrodes 125 on the electronic device 100 may still be operative for standard capacitive sensing. In such alternate embodiments, the electrodes that are disabled for standard capacitive sensing are those that are close enough to the rotatable knob interface 150 such that driving them with standard sensing signals may interfere with the resulting signals obtained from the electrodes 125 that are electrically coupled to the rotatable knob interface 150 (either to its conducting region 151 or to its patterned region 152). To illustrate this feature, in FIG. 1 there is shown a dashed line boundary 155. Electrodes 125 within the boundary 155 are in a "blackout zone" and not driven with a standard sensing signal. Rather, as described in detail below, any of the electrodes within the blackout zone that are electrically coupled to the rotatable knob interface are driven so as to capture rotations and compressions of the rotatable knob interface, as described below.

In general, within the blackout zone, a first set of the electrodes 125 are coupled to the conducting region 151 of the rotatable knob interface 150, and a second set of the electrodes 125 are coupled to the patterned region 152 of the rotatable knob interface 150. In embodiments, the first set are driven with a reference signal, and the second set are driven with a sensing signal to obtain a resulting signal modified by the then extant rotational configuration of the rotatable knob interface 150. Thus, in each of these alternate embodiments, all of the electrodes within the blackout zone boundary 155 may be disabled from standard capacitive sensing at all times.

It is noted that, as regards electrodes, the term "disabled" may include, for example, not driving an electrode at all, driving it with a guard signal, or driving it with a constant signal.

Continuing with reference to FIG. 1, as regards the electrodes of the electronic device 100 that are electrically coupled to the rotatable knob interface 150, as noted above, during an input sensing period a reference signal is supplied by the driver module 140 to the first set of electrodes 125, and a sensing signal is supplied to the second set of electrodes 125. In one or more embodiments, the reference signal may be a configurable DC output provided by the processing system 110. In some embodiments, the DC signal may be a ground signal of the electronic device 100. In one or more embodiments, a resulting signal is obtained from the second set of electrodes 125, the resulting signal being the sensing signal modified by the configuration of the rotatable knob interface 150. The resulting signal is then interpreted by the determination module 141 to determine a rotation of the rotatable knob interface 150, or, for example, to determine whether the knob interface has been pressed downward, to touch the surface of input device 100. In one or more embodiments, the rotation may be determined in relative terms, such as, for example, a differential angular change from a prior position, or in absolute terms, such as, for example, a positive or negative angular change from a home position.

FIG. 2, next described, illustrates capacitances that pertain between an example knob interface 150 and surrounding objects, when the knob interface stands alone, without further electrical coupling. With reference to FIG. 2, there is schematically shown knob interface 150 provided on a surface of an example display 120, and being turned or rotated by a user's hand 141. Knob interface 150 has a housing 153, which may be made of an insulating compound, such as a plastic, for example. A user physically interacts with the knob interface 150 by holding or touching the housing 153, and either rotating it or pushing down on it, as the case may be. Within the knob interface 150 is a conductor region 151 and an adjacent patterned region 152, as described above.

Continuing with reference to FIG. 2, there are shown two variable capacitances 160, 161. A first variable capacitance 160 exists between the conducting region 151 of the rotatable knob interface and display 120, and a second variable capacitance 161 exists between the conducting region 151 of the rotatable knob interface and a user's hand 141. It is noted that without further electrical connections, the conductor region 151 is not grounded, and thus floating. As a result, variable capacitance 160 is undetermined. Moreover, the capacitive coupling 161 between conductor region 151 and user's hand 141 is dependent upon how, and with what, the user grips the housing 153 of the rotatable knob interface 150. Thus, variable capacitance 161 will also vary depending upon whether the user is bare handed or gloved, and how many fingers he or she holds the housing 153 with, as well as the dielectric properties of the housing 153.

To address these issues, in one or more embodiments, conducting region 151 may be electrically coupled to one or more first electrodes of an example electronic device that are driven with a reference signal. Moreover, patterned region 152 may be electrically coupled to one or more second electrodes of the electronic device that obtain a resulting signal. The resulting signal is a sensing signal modified by the rotational position and compressive state of the rotatable knob interface. In one or more embodiments, the electronic device may be electronic device 100 of FIG. 1. Example implementations of these electrode couplings are described below, with reference to FIGS. 3, 6A and 7A, respectively.

Figure 4A:
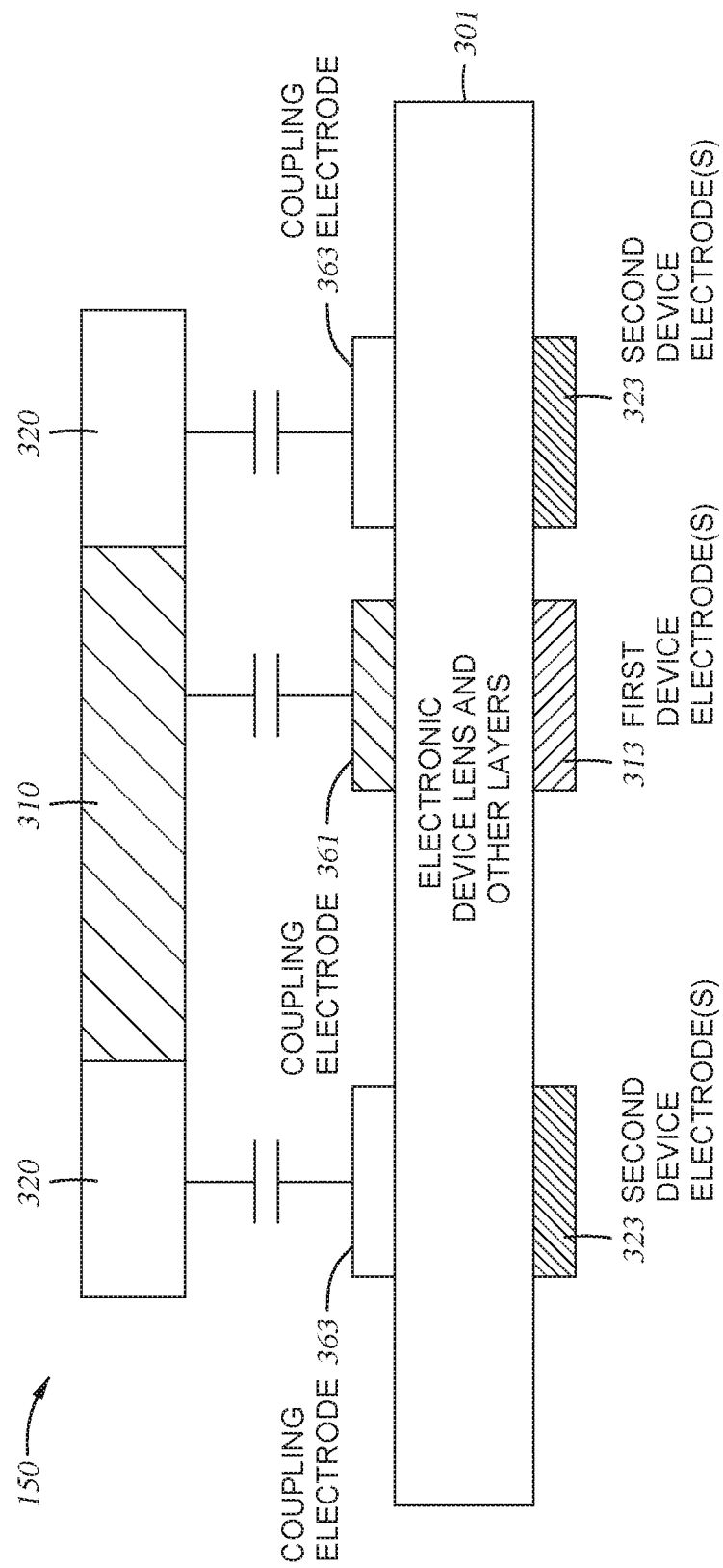
FIG. 4A illustrates an example side view of the rotatable knob interface of FIG. 3 in a home state, according to one or more embodiments.
Figure 4B:
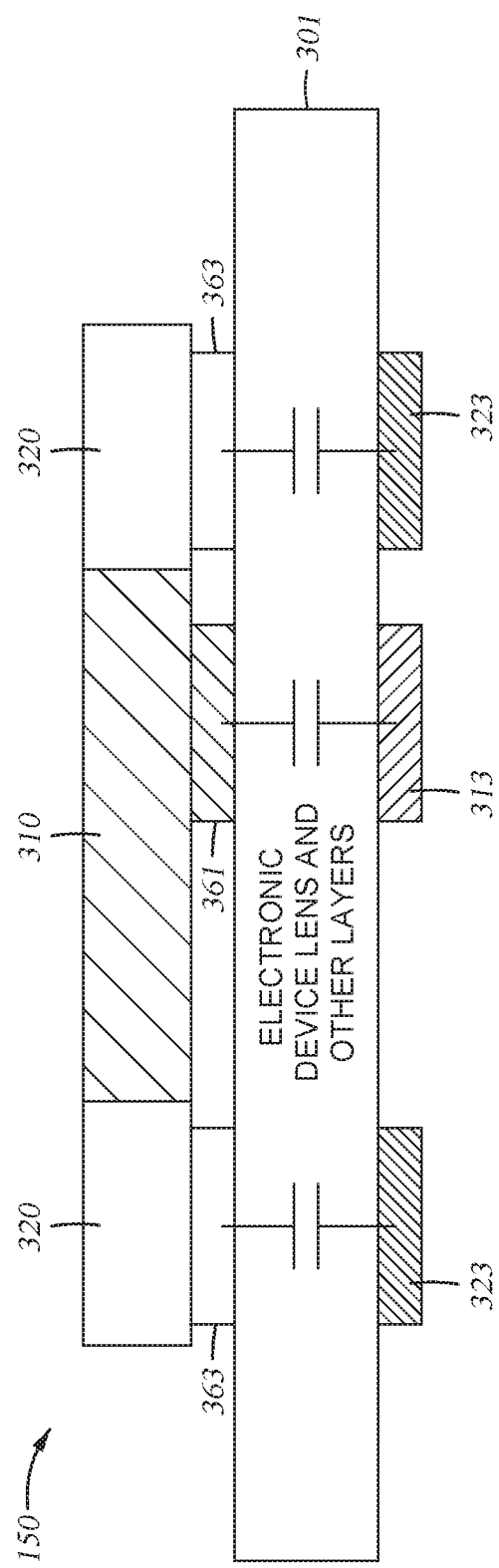
FIG. 4B illustrates an example side view of the rotatable knob interface of FIG. 3 in a compressed state, according to one or more embodiments.

FIG. 3 illustrates a top view of an example electronic device 301 with a rotatable knob interface 150 coupled to two sets of electrodes of the electronic device 301, according to one or more embodiments. The electronic device 301 may be, or may be equivalent to, electronic device 100 of FIG. 1, for example. The rotatable knob interface 150 may be equivalent to that shown in each of FIGS. 1 and 2, respectively. In the example of FIG. 3 the rotatable knob interface 150 is affixed to the input device 301 such that it rests above its surface in a "home" position, where it may be freely rotated without mechanical friction or drag with the surface. In one or more embodiments the rotatable knob interface 150 is biased in this home position, by, for example, a spring or other biasing device. In one or more embodiments, the rotatable knob interface 150 also has a "compressed" position, into which a user may place it by pressing down upon it. In the example of FIG. 3, input device 301 may be an AMP device. Moreover, it may include TDDI technology. Some of the electrodes of electronic device 310 are coupled to respective portions of the rotatable knob interface 150, and these electrodes are shown in FIG. 3. Thus, electrode 313 is provided underneath, and electrically coupled to, an inner conducting region 310 of the rotatable knob interface 150, and the two electrodes 323 are provided underneath, and electrically coupled to, an outer patterned region 320 of the rotatable knob interface 150. In one or more embodiments, during a sensing interval of input device 301, the electrode 313 may be driven with a reference signal, and the two electrodes 323 may be driven with a sensing signal, and a resulting signal received on these two electrodes. In one or more embodiments, these signals may be provided by processing circuitry 360, as shown, which may operate in an identical or equivalent fashion to processing circuitry 110 of FIG. 1, described above. In some examples, the processing circuitry 360 may include TDDI driving circuitry. Moreover, in one or more embodiments, the electrodes 313 and 323 of the electronic device 301 are respectively electrically coupled to the two regions of rotatable knob interface 150 via coupling electrodes that are provided within the rotatable knob interface 150. The coupling electrodes are not shown in FIG. 3 due to the top view it presents. However, the coupling electrodes of rotatable knob interface 150 are illustrated in FIGS. 4A, 4B and 5, and described below.

Continuing with reference to FIG. 3, in one or more embodiments the reference signal provided to the electrode 313 of the electronic device 301, which electrode is electrically coupled to the conducting region 310 of the rotatable knob interface 150, may be a DC level signal. In some embodiments, the reference signal may be a ground signal of the electronic device 301. For example, the electronic device 301 may output a ground signal from arbitrarily chosen analog front ends (AFEs), and it may be this ground signal that is used as the reference signal provided to the electrode 313. It is noted that this reference signal is to be different than a sensing waveform of the electronic device 301.

In one or more embodiments, the sensing signal provided to the electrodes 323 of electronic device 301, which are electrically coupled to the patterned region 320 of the rotatable knob interface 150, may be any sensing signal that may be output by the processing circuitry 360. It is noted that, in embodiments, the coupling electrodes provided in knob interface 150 never change position relative to the electronic device 301 while the knob is operated. Thus, only the rotatable knob is moved.

In one or more embodiments, processing circuitry 360 may drive the reference signal onto the electrode 313. Further, the processing circuitry 360 may choose between a guard voltage, e.g., VGUARD, and the DC level voltage. In such embodiments, the DC voltage may be used for normal sensing of the rotatable knob interface as described above. However, during baselining in firmware algorithms, the processing circuitry 360 may apply the guard voltage to the reference electrode 313. In one or more embodiments, this mitigates capturing any response from the rotatable knob interface into a baseline. Moreover, in one or more embodiments, switching between driving the reference electrode(s) with a VGUARD signal and a DC signal allows for the measurement of the precise positon of the coupling electrodes of the rotatable knob interface for, for example, either fine calibration against a mechanical part to part variation in a mounting of the rotatable knob interface 150, or for auto discovery of presence and position of a knob on a display screen (e.g., LCD) of the electronic device 301.

FIGS. 4A and 4B, next described, illustrate both the coupling electrodes of an example rotatable knob interface, as well as a press function of the rotatable knob interface, in accordance with various embodiments.

With reference to FIG. 4A, there is shown the electronic device 301 and the rotatable knob interface 150, of FIG. 3, here presented from a side view. The side view of FIG. 4A allows for viewing of the different layers of both the electronic device 301 and the rotatable knob interface 150 that are involved. Thus, at the top of the figure are the conductive ring 310, shown as shaded, and the outer patterned ring 320, shown in white. Beneath the two rings of the rotatable knob interface 150, but still a part of it, are three coupling electrodes 361, 363. Coupling electrode 361 couples to the conductor ring and to a first device electrode 313 of electronic device 301, and coupling electrode 363 couples to the patterned ring and to second device electrodes 323 of electronic device 301. Device electrodes 313 and 323 may each be, for example, ones of electrodes 125 shown in FIG. 1 that are within the boundary 155 of FIG. 1. The coupling electrodes 361 of the rotatable knob interface 150 are provided at its bottom surface, and they thus rest on the lens or display screen of electronic device 301. In some embodiments, the coupling electrodes 361, 363 may be shaped to form a parallel plate capacitance with the conducting ring 310 and patterned ring 320, respectively, or, for example, they may be coupled to these structures via fringing coupling. Alternatively, as shown, the first and second device electrodes 313, 323 are provided underneath the lens and other layers of electronic device 301.

It is noted that FIG. 4A depicts the "home" position of the rotatable knob interface 150. Thus, the coupling electrodes 361 and 363, abutting the surface of the electronic device 301, are separated from the conducting ring 310 and the patterned ring 320 of the rotatable knob interface 150, and, as shown, there is a capacitance between each coupling electrode and its respectively electrically coupled ring. If this capacitance is significantly increased, or if there is an electrical short, between the conducting ring 310 and the coupling electrode 361, the coupling of the reference signal provided on first device electrode(s) 313 would increase. This is the basis of detecting the change from the configuration of FIG. 4A, depicting the home position of the rotatable knob interface 150, to that of FIG. 4B, depicting the "compressed" position of the rotatable knob interface 150. Detection of this change is referred to herein as the "press functionality." This is next described.

FIG. 4B illustrates the example side view of FIG. 4A, albeit with the example rotatable knob interface 150 in a compressed state, according to one or more embodiments. Thus, in one or more embodiments, the press functionality may be realized by electrically shorting the knob interface 150 to the coupling electrode(s) 361, 363, thus increasing coupling of (or electrically shorting of) the reference signal provided to device electrode 313 to coupling electrode(s) 361. In one or more embodiments, an increase in this reference signal may be determined, and may be interpreted as an indication of the compressed state of rotatable knob interface 150. For example, the increase in an amplitude of the reference signal may be measured by an analog front end (AFE) of electronic device 301 sensing capacitance. In such case, the increase of the measured signal is manifested in the AFE as an increase in the current flow in the shorted case shown in FIG. 4B.

In one or more embodiments, rotation of the knob interface may still be performed by a user and decoded by the electronic device 301 while the rotatable knob interface is in its compressed state.

Figure 5A:
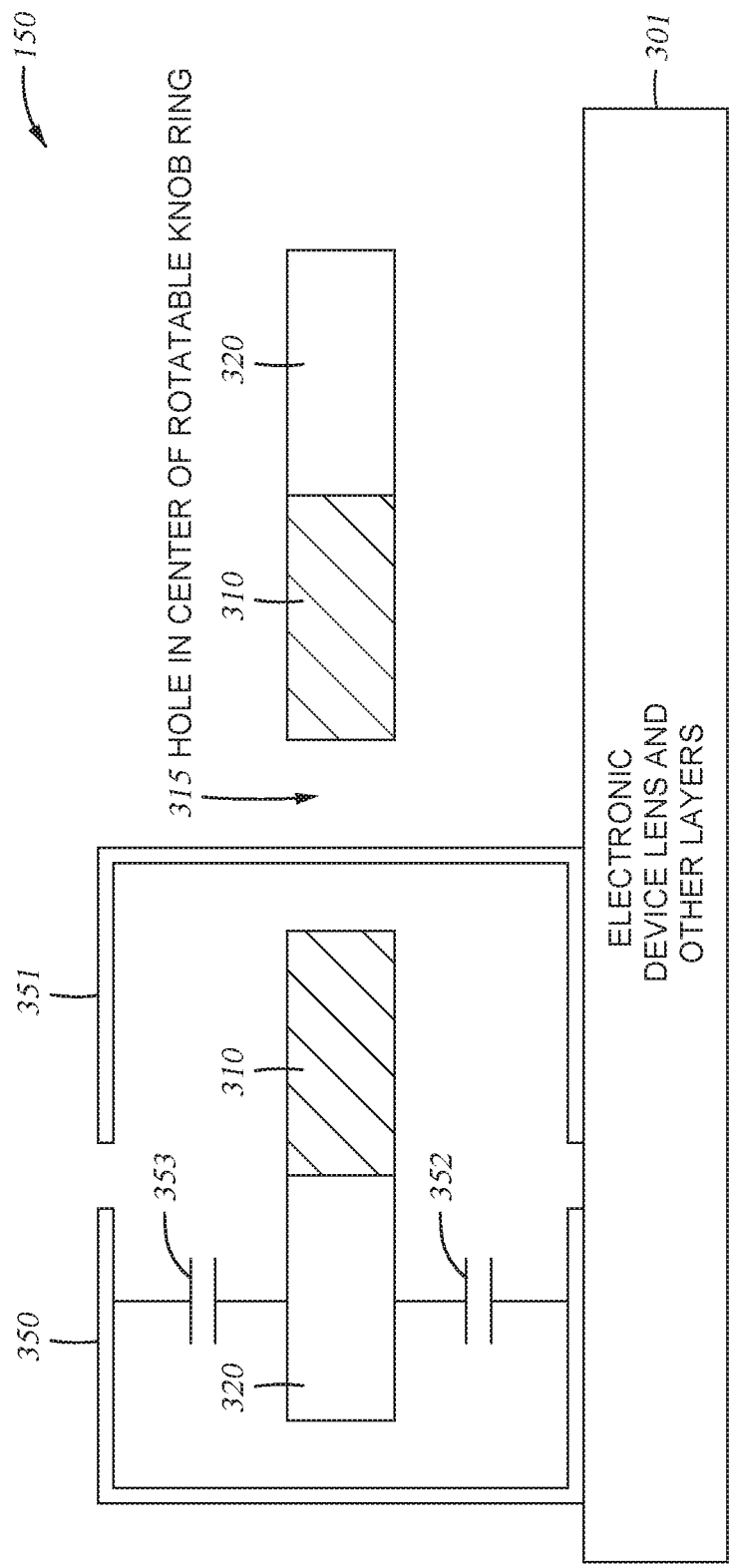
FIG. 5A illustrates an example side view of a rotatable knob interface provided with an extended coupling electrode that surrounds the conductive ring and patterned sub-area of the ring, according to one or more alternate embodiments.

FIG. 5A illustrates a cross-sectional side view of the example rotatable knob interface 150 of FIG. 3. The depicted cross-section cuts through the center of the rotatable knob interface, and there is thus seen a hole 315 in the center of the example rotatable knob interface 150, the hole 315 surrounded on both sides of the sectional slice by the conducting region 310. The outer side of the conducting region 310 is adjacent to the patterned region 320, as shown. On the left side of FIG. 5A there are shown two coupling electrodes, which each have a wrap-around shape, in accordance with various alternate embodiments. These wrap-around coupling electrodes are used in place of, for example, the coupling electrodes 361 and 363 of FIG. 4A. Thus, the coupling electrode 351 couples to the conducting region 310, and the coupling electrode 350 couples to the patterned region 320. In one or more embodiments, the depicted wrap-around electrodes 350, 351 have increased coupling to their respective regions of the rotatable knob interface 150, as indicated in FIG. 5A by the capacitances drawn in, as well as to the electrodes of the electronic device 301.

It is noted that with reference to FIGS. 3-5, in embodiments, because the conducting ring 310 is coupled to device electrode(s) of the electronic device 360, to which a reference voltage is applied, e.g., ground, as described above, the rotatable knob interface 150 is essentially not affected by capacitive coupling of a user's gloved or ungloved hand, as described above with reference to FIG. 2.

In some in-vehicle embodiments it is useful for an electronic device to report if a knob of an attached rotatable knob interface is being grabbed by a user, even before the knob is rotated or pressed down by that user. Thus, in one or more embodiments, sensing electrodes in a predefined area around the knob may be used to detect a user's fingers, whether gloved or ungloved, hovering above the sensing electrodes. This may be used as an indication that a user has grabbed the knob. In embodiments, the pre-defined area may be as shown, for example, in FIG. 5B.

Figure 5B:
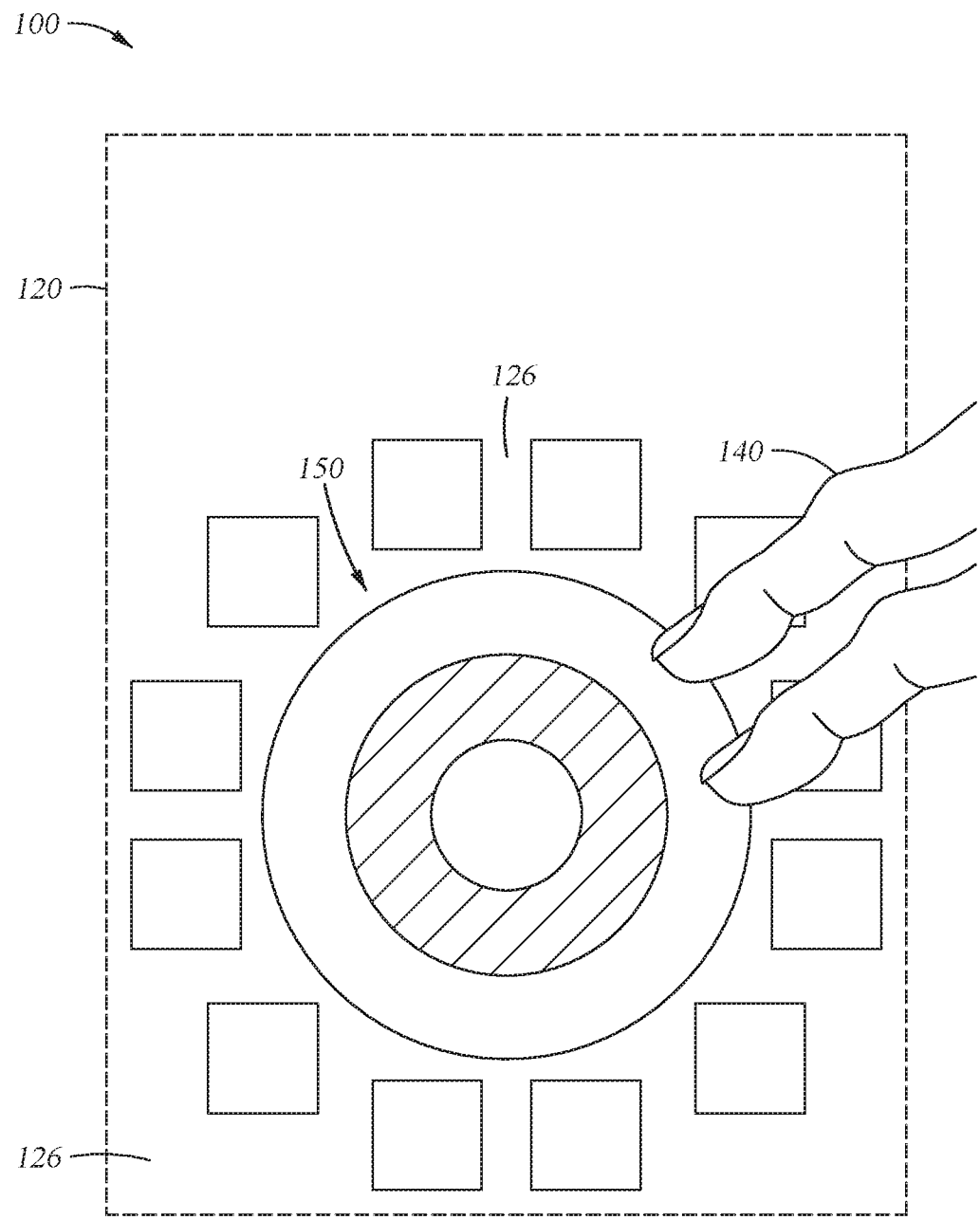
FIG. 5B illustrates sensing electrodes in a predefined area around an example knob interface used to detect a user's fingers, prior to any rotation of the knob interface, according to one or more embodiments.

With reference to FIG. 5B, two user's fingers 140 are approaching the rotatable knob interface 150, provided on a display 120 of an example electronic device 100. Electronic device 100 may be the same device as that shown in FIG. 1, for example, showing here electrodes 126 that surround, in close proximity, the rotatable knob interface 150. Electrodes 126 of FIG. 5B are a subset of electrodes 125 of FIG. 1. In one or more embodiments, the electrodes 126 may be used to sense the user's fingers 140 that either have grabbed, or are inferred to be about to grab, the rotatable knob interface 150. In one or more embodiments, the same sensing signals may be used to drive electrodes 126 of FIG. 5B that are used to drive the second device electrodes 323 shown in FIG. 4A that are electrically coupled to the patterned region 320 of the rotatable knob interface 150. A resulting signal on the electrodes 323 of FIG. 4A is obtained and used to determine any rotation, and a resulting signal on electrodes 126 of FIG. 5B is obtained and used to determine finger presence or close proximity.

As noted above, in one or more embodiments, a knob interface includes a patterned region to provide rotary encoding for either an absolute position of the knob or for incremental encoding of the position. FIGS. 6A, 7A and 7B illustrate three example rotary coding schemes, that may, in such embodiments, be used to pattern an example patterned region of a knob interface.

Figure 6A:
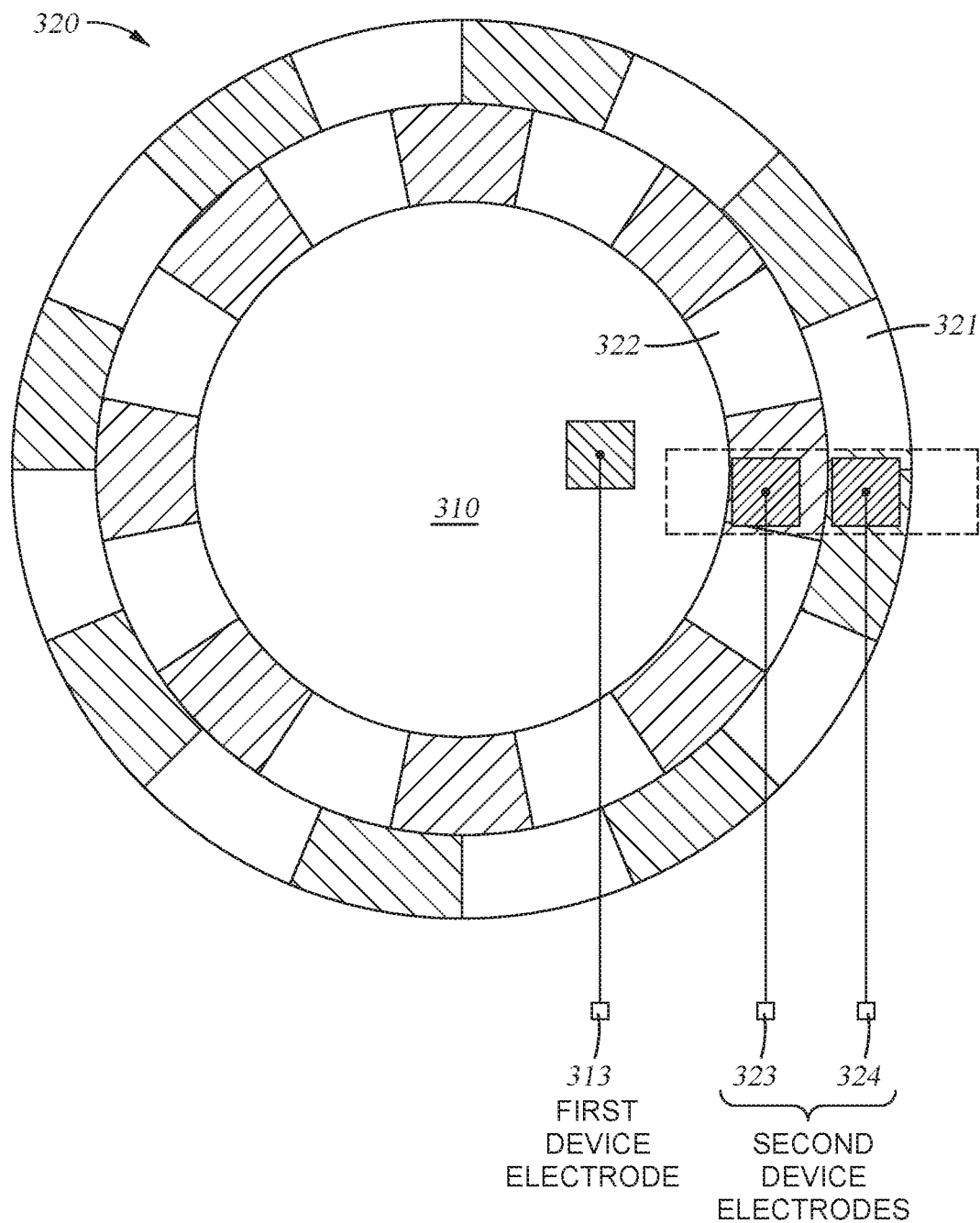
FIG. 6A illustrates a top view of the rotatable knob interface of FIG. 3 provided with an example incremental rotary encoding scheme, according to one or more embodiments.

FIG. 6A illustrates a top view of the conductor and patterned regions of the example rotatable knob interface 150 of FIG. 3, where the patterned region is provided with a first example rotary encoding scheme, according to one or more embodiments. In the depicted example of FIG. 6A, in one embodiment, the electronic device 301 may be an AMP device. In other embodiments, various other electronic devices may be used. With reference to FIG. 6A, there is shown the conducting region 310, surrounded by the patterned region 320. The patterned region 320 is divided into, for example, two concentric tracks 321 and 322, each of which has alternating conducting portions, shown in black, and non-conducting portions or voids, shown in white. The conducting region 310 is electrically coupled to an example first device electrode 313 of electronic device 301, which is provided with a reference signal, as described above. As was described above, but not shown in FIG. 6A due to FIG. 6A being a top view, the first device electrode 313 is electrically coupled to the conducting region 310 via a coupling electrode of the rotatable knob interface. Similarly, each track of the patterned region 310 is electrically coupled to an example second device electrode of the electronic device 301. In embodiments, these second device electrodes are driven with a sensing signal, as described above. Thus, for example, the inner track 322 is coupled (via a coupling electrode that is not shown) to a second device electrode 323, and outer track 321 is coupled (via a coupling electrode that is not shown) to a second device electrode 324. In the depicted example, the second device electrodes 323, 324 are in the same row of a sensor array of the electronic device 301. The second device electrodes 323, 324 are respectively driven with a sensing signal, as noted above, from which resulting signals are obtained. Thus, second device electrodes may be referred to herein as "sensing electrodes." Similarly, first device electrodes may be referred to herein as "reference electrodes."

Continuing with reference to FIG. 6A, as a user turns the rotatable knob interface, the two tracks 321 and 322 rotate, and the two second device sensors, being in fixed positions in the sensor array of the electronic device 301, remain fixed. Thus, as the tracks roll over them, when a black section of each track is coupled to the second device sensors 323, 324, the capacitive coupling between the conductor region 310 and the sensing electrodes 323, 324 is highest. Similarly, when a white section of each track is coupled to the sensing sensors 323, 324, the capacitive coupling between the conductor region 310 and the sensing electrodes 323, 324 is lowest. By analyzing the resulting signals on each of the second device sensors 323, 324, the orientation and relative rotation of the rotatable knob interface relative to a prior sensing interval may be determined.

FIG. 6B illustrates example resulting signals that may be received on the sensing electrodes 323 and 324 of FIG. 6A, as modified by the rotatable knob interface 150 whose patterned region is patterned as illustrated in FIG. 6A, and the interpretation of those resulting signals, according to one or more embodiments. It is noted that the signals shown in FIG. 6B are binary. In embodiments, conversion from a continuous output from an AFE sensing from the electrodes may be provided by either thresholding in software, or, for example, as an additional step performed in analog hardware. In such embodiments, after thresholding the binary signals may be converted to a direction of rotation of the knob (e.g., left or right, shown as +1 or −1 in the table of FIG. 6B) according to the matrix.

Figure 7A:
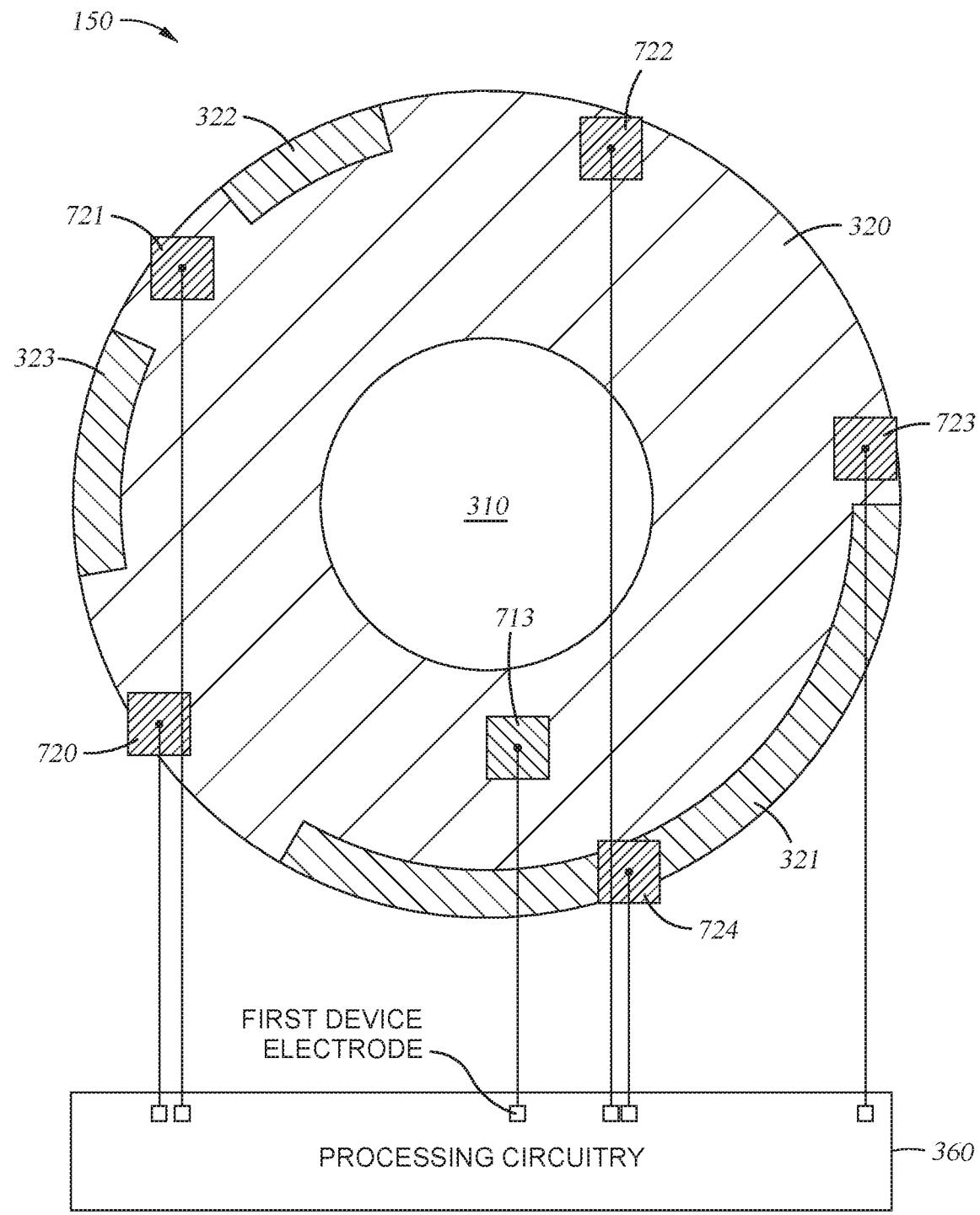
FIG. 7A illustrates a top view of the rotatable knob interface of FIG. 3 provided with a first example rotary encoding scheme that determines absolute positon of the knob, according to one or more embodiments.

FIG. 7A illustrates a top view of the conducting region 310 and patterned region 320 of the example rotatable knob interface 150 of FIG. 3, where the patterned region is provided with a second example rotary encoding scheme that determines an absolute positon of the knob, according to one or more embodiments. With reference to FIG. 7A, patterned region 320 is encoded with a sequential Gray code. This is implemented by providing arcuate electrodes 321, 322 and 323 of varying arc lengths provided on an outer ring of the patterned region 320. The outer ring of the patterned region 320 is also coupled to a set of sensing electrodes, such as, in this example, the five electrodes 720, 721, 722, 723 and 724 respectively provided on the electronic device 301 underneath the outer ring of the patterned region 320. The five sensing electrodes 720, 721, 722, 723 and 724 are disposed at five equidistantly spaced positions under the outer ring, such that the three arcuate electrodes 321, 322 and 323, as the knob interface is rotated, each couple to some, one or none of the sensing electrodes.

Additionally, the conducting region 310 is coupled to the reference electrode, "first device electrode" 713. In embodiments, first device electrode 713 is provided with a reference signal, and second device (sensing) electrodes 720-724 are driven with a sensing signal, as described above, by the processing circuitry 360. As a user turns a knob of the example rotatable knob interface 150, the two regions rotate and the sensing electrodes 720-724, being in fixed positions in the sensor array of the electronic device 301, remain fixed. Thus, as the arcuate conductors pass over them, the capacitive coupling between the conductor region 310 and each of the sensing electrodes 720-724 changes. By analyzing the resulting signals obtained from the sensing electrodes 720-724, the absolute position of the knob interface 150 may be determined.

Figure 7B:
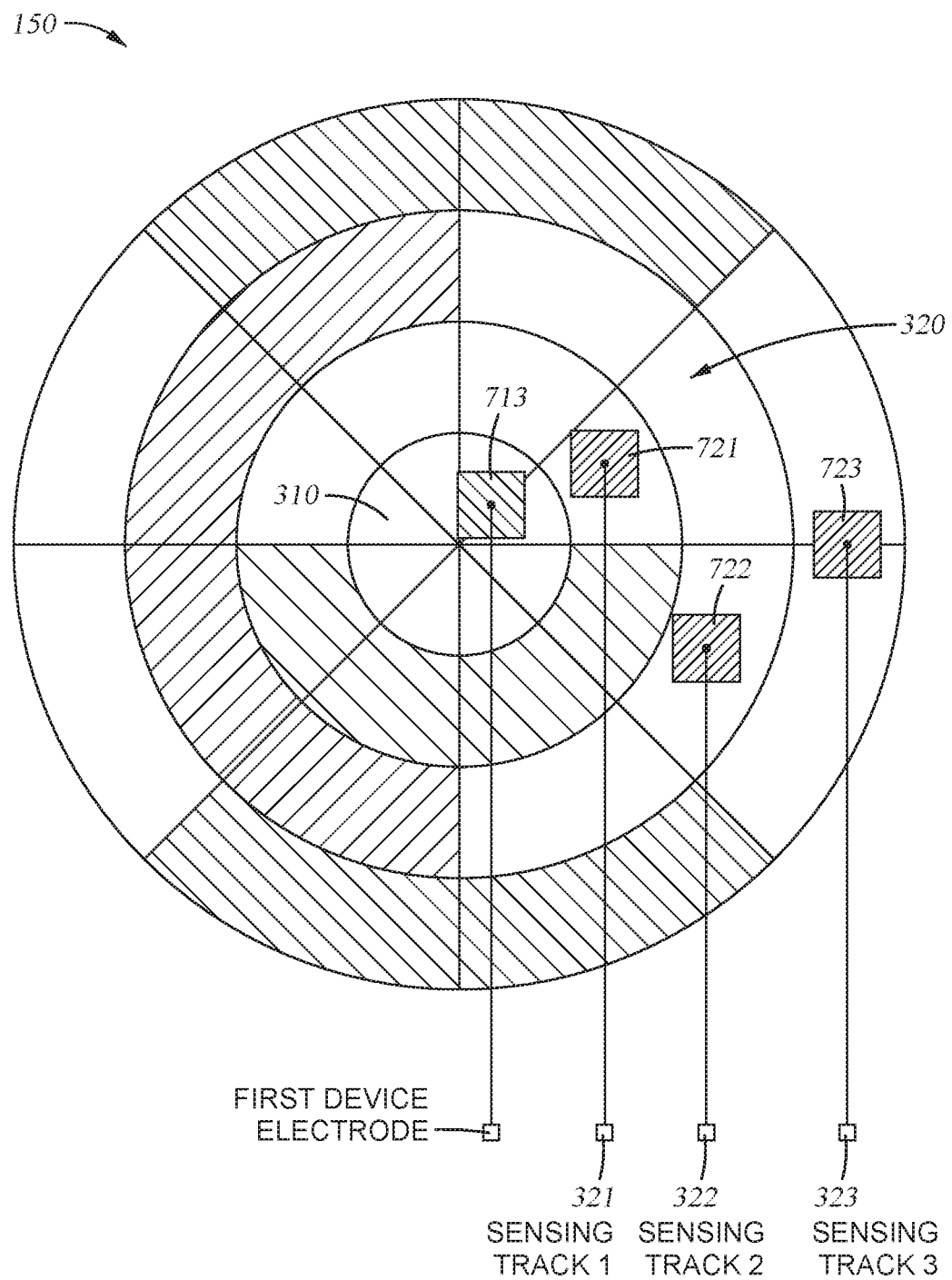
FIG. 7B illustrates a top view of the rotatable knob interface of FIG. 3 provided with a second example rotary encoding scheme that determines absolute positon of the knob, according to one or more embodiments.

FIG. 7B illustrates a third example of a pattern that may be provided on the patterned region 320 of the rotatable knob interface 150 of FIG. 3. As shown in FIG. 7B, the patterned region 320 is provided with a rotary encoding scheme that also determines absolute positon of the knob, according to one or more embodiments. With reference to FIG. 7B, there is shown the conducting region 310, surrounded by the patterned region 320, of the rotatable knob interface 150. The conducting region 310 is coupled, via a (not shown) coupling electrode of the rotatable knob interface 150, as described above, to the sensing electrode 713, which is provided by the electronic device 301 with a reference voltage. The patterned region 320 is encoded with a three-bit Gray code, and is thus divided into three concentric tracks, each with a pattern of alternating conductor and void, as shown. Further, each track is coupled to a sensing electrode, as follows. The innermost track, sensing track 1 321, is coupled to sensing electrode 721. The center track, sensing track 2 322, is coupled to sensing electrode 722, and the outermost track, sensing track 3 323, is coupled to sensing electrode 723. The sensing electrodes 721-723 are each provided on the electronic device 301 underneath the patterned region 320, as shown, such that the three sensing tracks 321, 322 and 323 may, as the knob interface is rotated, pass over their respective sensing electrode.

In embodiments, the reference electrode 713 is provided with a reference signal, and the sensing electrodes 721-723 are driven by processing circuitry with a sensing signal, as described above. As a user turns the rotatable knob interface 150, the patterned region 320 rotates, and the sensing electrodes 721-723, being in fixed positions in the sensor array of the electronic device 301, remain fixed. Thus, as the conducting portions of the three sensing tracks 321-323 respectively pass over them, capacitive coupling between the conductor region 310 and each of the sensing electrodes 721-723 respectively changes. By analyzing the resulting signals obtained on each of sensing electrodes 721-723, the absolute rotational position of the rotatable knob interface 150 may be determined.

Figure 8:
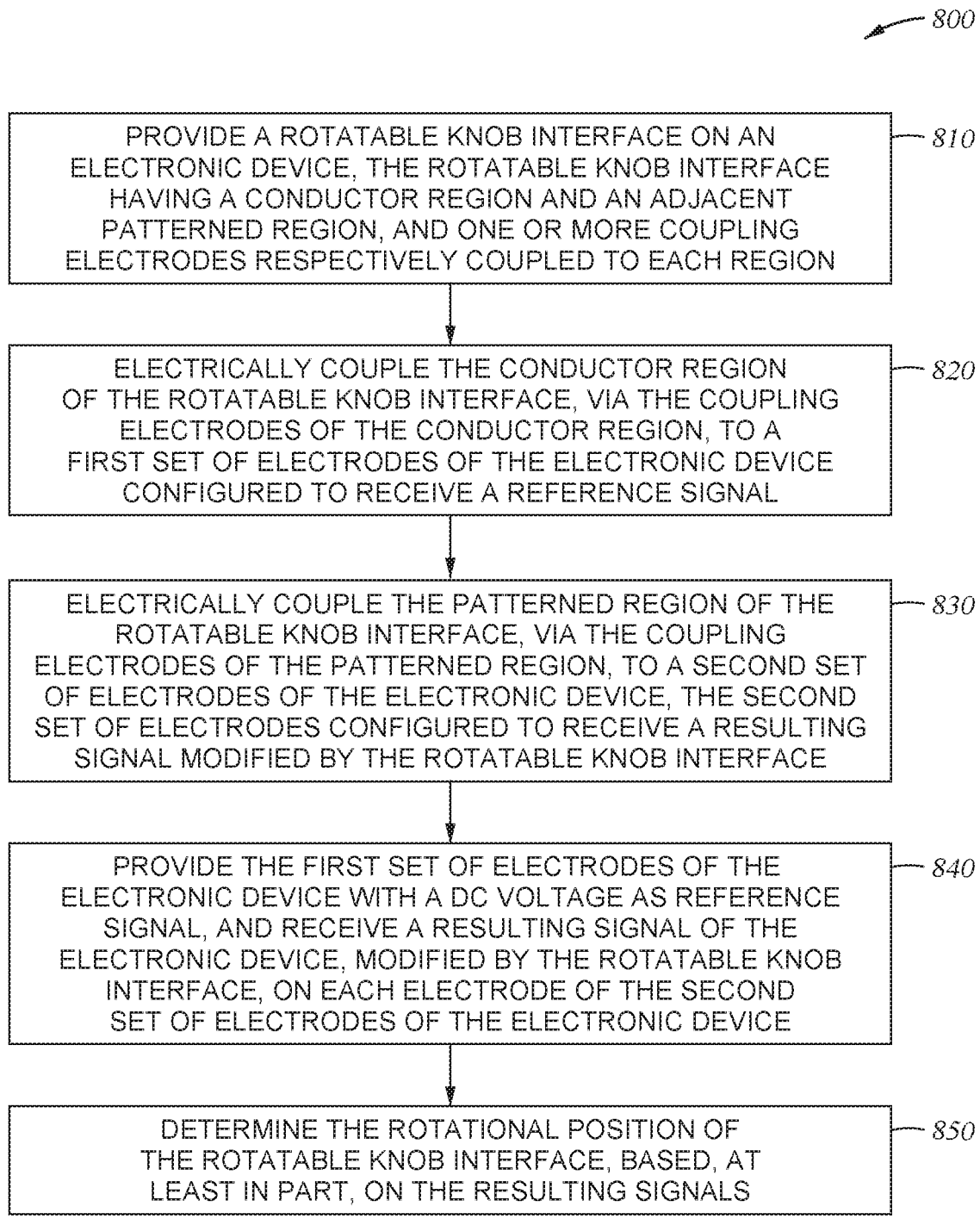
FIG. 8 illustrates an example of a method for implementing a rotatable knob interface on an example input device, according to one or more embodiments.

FIG. 8 is a process flow chart illustrating a method 800 for implementing a rotatable knob interface on an example electronic device, and determining a position and/or state of the rotatable knob interface according to one or more embodiments. For example, the electronic device may be a combined display and sensing device, such as one that, for example, includes TDDI technology, as described above.

Method 800 includes blocks 810 through 850. In alternate embodiments, method 800 may have more, or fewer, blocks. Method 800 begins at block 810, where a rotatable knob interface is provided on an electronic device, the rotatable knob interface having a conductor region and a patterned region, and one or more coupling electrodes respectively coupled to each region. For example, the rotatable knob interface may be any of those illustrated in FIGS. 1 through 7B, described above.

From block 810, method 800 proceeds to block 820, where the conducting region of the rotatable knob interface is electrically coupled, via the coupling electrodes of the conductor region, to a first set of electrodes of the electronic device. The first set of electrodes of the electronic device are configured to receive a reference signal. For example, the first set of electrodes may be the electrode 313 of FIG. 3 or FIG. 6A, or the electrode 710 of FIGS. 7A and 7B. Or for example, the set of first electrodes may include several electrodes. As regards the reference signal, for example, it may be a ground signal generated by processing circuitry of the electronic device, such as, for example, the processing circuitry 360 of the electronic device 301 of FIG. 3. As another example, the reference signal may be a ground signal output by a TDDI device from an arbitrarily chosen analog front end.

From block 820, method 800 proceeds to block 830, where the patterned region of the rotatable knob interface is electrically coupled, via the coupling electrodes of the patterned region, to a second set of electrodes of the electronic device. The second set of electrodes of the electronic device are configured to receive a resulting signal of the electronic device as modified by the rotatable knob interface. For example, the second set of electrodes may be the electrode 323 of FIG. 3, or the electrodes 323 and 324 of FIG. 6A, or, for example, the electrodes 720 through 724 of FIG. 7A, or the electrodes 720 through 722 of FIG. 7B.

From block 830, method 800 proceeds to block 840, where the first set of electrodes are provided with a DC voltage as the reference signal, and each of the second set of electrodes receives a resulting signal of the electronic device as modified by the rotatable knob interface. As noted above, the resulting signal is the same signal used to drive each of the second set of electrodes, except that when it is measured, it has been modified by the rotational position of the rotatable knob interface.

From block 840, method 800 proceeds to block 850, where the rotational position of the rotatable knob interface is determined, based at least in part, on the resulting signals. Method 800 terminates at block 850.

Figure 9:
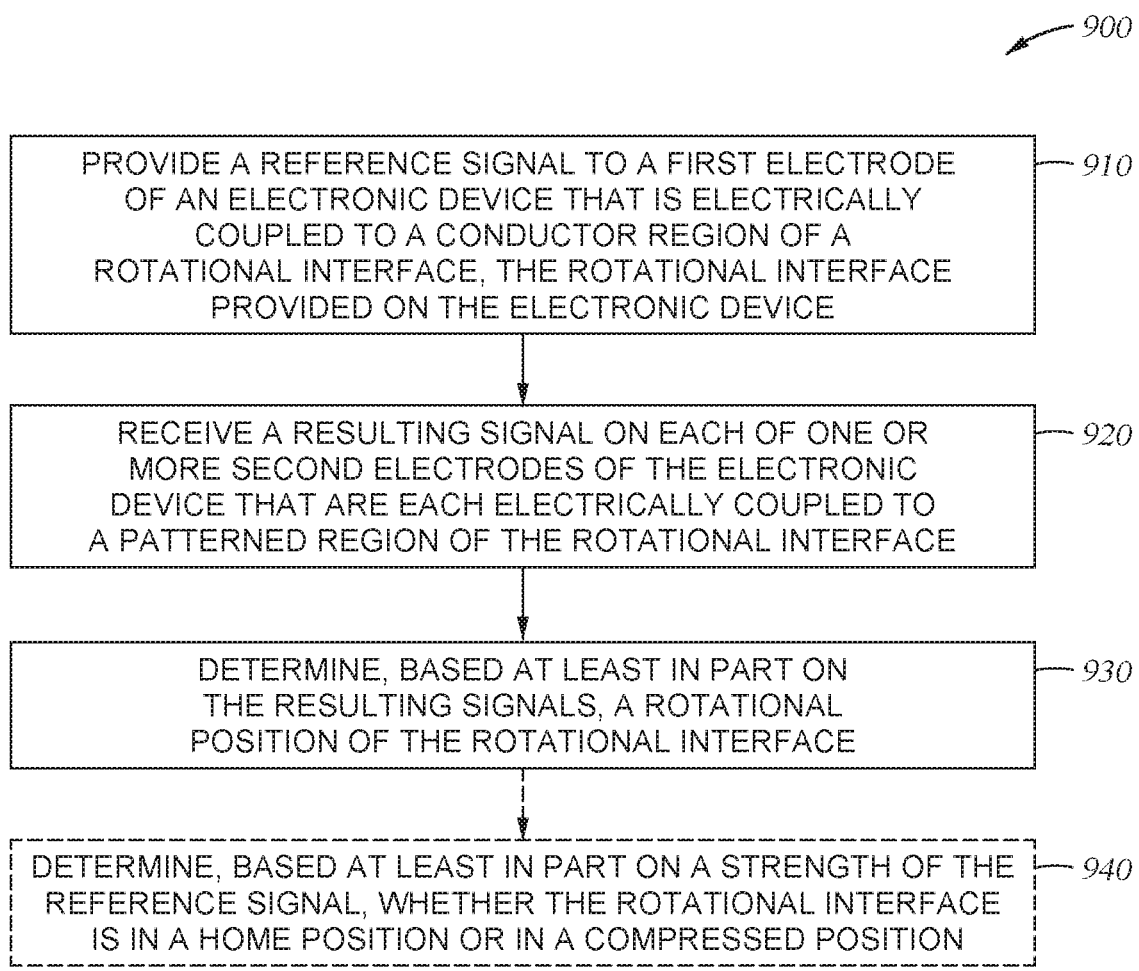
FIG. 9 illustrates an example of a method for processing signals from an input device having a rotational interface, according to one or more embodiments.

FIG. 9 is a process flow chart illustrating a method 900 for processing signals from an electronic device having a rotational interface, the rotational interface having a conductor region and a patterned region, the rotational interface provided on top of a display screen of the electronic device, in accordance with various embodiments. For example, the electronic device may include TDDI technology, as described above, and the rotational interface may be any of the rotatable knobs illustrated in FIGS. 1-7B, described above.

Method 900 includes blocks 910 through 930, and optional block 940. In alternate embodiments, method 900 may have more, or fewer, blocks. Method 900 begins at block 910, where a reference signal is provided to a first electrode of the electronic device that is electrically coupled to the conductor region of the rotational interface. For example, the reference signal may be a ground signal of the electronic device, or, for example, another signal generated by processing circuitry of the electronic device.

From block 910, method 900 proceeds to block 920, where a resulting signal is received on each of one or more second electrodes of the electronic device that are each electrically coupled to the patterned region, each resulting signal modified by the rotational interface. For example, the second electrodes may be respectively electrically coupled to different portions of the patterned region, such as, for example, different tracks. This is shown, for example, in FIG. 6A, described above, where the second electrodes 323 and 324 are respectively electrically coupled to the two separate tracks of the patterned region 320 of the knob interface 150. Another example is shown in FIG. 7A, described above, where the second electrodes 720-724 are electrically coupled to five different positions that are equidistantly spaced along an outer rim of the patterned region 320 of the knob interface 150. Still another example is illustrated in FIG. 7B, described above, From block 920, method 900 proceeds to block 930, where a rotational position of the rotational interface is determined, based, at least in part, on the resulting signals. For example, this determination may be made by a determination module of the electronic device, such as, for example the determination module 141 of the electronic device 100 of FIG. 1. Method 900 may terminate at block 930, or, in some embodiments, may optionally proceed to optional block 940.

In such embodiments, from block 930, method 900 may optionally proceed to block 940, where it may be determined, based at least in part on a strength of the reference signal provided to the first electrode of the electronic device, whether the rotational interface is in a home position or in a compressed position. In such embodiments, method 900 then terminates at optional block 940.

Thus, in one or more embodiments, a rotatable knob interface may be provided on an electronic device, the rotatable knob interface including fixed coupling electrodes to interface with sensing electrodes of the electronic device. The rotatable knob interface may include a conducting ring and a patterned ring, which may be patterned with a rotary encoder. In embodiments, the conducting region is coupled, via a first set of coupling electrodes, to a first set of electrodes of the electronic device, the latter driven with a reference voltage. Similarly, the patterned region is coupled, via a second set of coupling electrodes, to a second set of electrodes of the electronic device that is configured to receive a resulting signal modified by the rotatable knob interface. Based, at least in part on the resulting signal, processing circuitry of the electronic device may determine a rotational position of the knob of the rotatable knob interface.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. An electronic device, comprising:
a rotatable interface configured to be placed on an input device, the rotatable interface including a conductor region and an adjacent patterned region;
a first set of coupling electrodes configured to be electrically coupled to the conductor region and configured to receive a reference signal from a first electrode of the input device; and
a second set of coupling electrodes configured to be electrically coupled to the patterned region and to be electrically coupled to a second electrode of the input device, wherein the second electrode is configured to receive a resulting signal modified by the rotatable interface;
wherein at least a portion of each electrode of the first set of coupling electrodes and the second set of coupling electrodes is respectively provided underneath the conductor and patterned regions, and is configured to abut the input device;
wherein at least one of the first set of coupling electrodes wraps around the conductor region and/or at least one of the second set of coupling electrodes wraps around the patterned region.

2. The electronic device of claim 1, wherein the conductor region and the patterned region each have a ring shape, and wherein the patterned region is adjacent to the conductor region.

3. The electronic device of claim 1, wherein the electronic device is disposed in an automobile.

4. The electronic device of claim 1, wherein the input device includes a liquid crystal display (LCD) or an organic light emitting diode (OLED) display, and the rotatable interface is placed on an upper surface of the input device.

5. The electronic device of claim 1, wherein the patterned region is configured to allow processing circuitry of the input device to determine an absolute rotational position or a relative rotational position of the rotatable interface.

6. The electronic device of claim 5, wherein the patterns on the patterned region embody a sequential quadrature encoder.

7. The electronic device of claim 5, wherein the patterns on the patterned region embody a sequential Gray code or a three bit Gray code for obtaining an absolute position of the rotatable interface.

8. The electronic device of claim 1, wherein each electrode of the first set of coupling electrodes and the second set of coupling electrodes remains stationary during any rotation of the rotatable interface.

9. The electronic device of claim 1, wherein the reference signal is a ground signal.

10. The electronic device of claim 1, wherein the rotatable interface is configured to have two states, wherein the two states include:
a home state in which there is a first distance between the conductor region and the first set of coupling electrodes; and a compressed state in which there is a second distance between the conductor region and the first set of coupling electrodes, wherein the second distance less than the first distance.

11. The electronic device of claim 10, further comprising:
a resisting spring element configured to position the rotatable interface in the home state.

12. A sensing system, comprising:
an input device comprising a display panel, processing circuitry, a reference electrode, and a sensing electrode; and
a rotatable device configured to be placed on the display panel, the rotatable device including:
   a conductor region and an adjacent patterned region;
   a first set of coupling electrodes configured to be electrically coupled to the conductor region and to receive a reference signal from the reference electrode; and
   a second set of coupling electrodes configured to be electrically coupled to the patterned region and to the sensing electrode, wherein the sensing electrode is configured to receive a resulting signal modified by the rotatable device;
wherein at least a portion of each electrode of the first set of coupling electrodes and the second set of coupling electrodes is respectively provided underneath the conductor and patterned regions, and is configured to abut the input device;
wherein at least one of the first set of coupling electrodes wraps around the conductor region and/or at least one of the second set of coupling electrodes wraps around the patterned region.

13. The sensing system of claim 12, wherein the patterned region has patterns which are configured to allow the processing circuitry of the input device to determine an absolute rotational position or a relative rotational position of the rotatable device.

14. The sensing system of claim 12, wherein the rotatable device is configured to have two states, wherein the two states include:
   a home state in which there is a first distance between the conductor region and the first set of coupling electrodes; and
   a compressed state in which there is a second distance between the conductor region and the first set of coupling electrodes, wherein the second distance is less than the first distance.

15. The sensing system of claim 14, wherein the sensing system is disposed in an automobile.

16. A method of processing signals from an input device, the method comprising:
   providing a reference signal to a first electrode of the input device, wherein the input device has a rotational interface, wherein the rotational interface has a conductor region and a patterned region, wherein the rotational interface is provided on top of a display screen of the input device, and wherein the first electrode is electrically coupled to the conductor region;
   receiving one or more resulting signals on one or more second electrodes of the input device that are each electrically coupled to the patterned region, wherein the one or more resulting signals are modified by the rotational interface; and
   determining a rotational position of the rotational interface based, at least in part, on the one or more resulting signals;
wherein the rotational interface further comprises:
   a first set of coupling electrodes configured to be electrically coupled to the conductor region and configured to receive the reference signal from the first electrode; and
   a second set of coupling electrodes configured to be electrically coupled to the patterned region and to be electrically coupled to the one or more second electrodes of the input device;
wherein at least a portion of each electrode of the first set of coupling electrodes and the second set of coupling electrodes is respectively provided underneath the conductor and patterned regions, and is configured to abut the input device;
wherein at least one of the first set of coupling electrodes wraps around the conductor region and/or at least one of the second set of coupling electrodes wraps around the patterned region.

17. The method of claim 16, wherein the first electrode of the input device is coupled to the conductor region of the rotational interface via the first set of coupling electrodes, and wherein the one or more second electrodes of the input device is coupled to the patterned region of the rotational interface via the second set of coupling electrodes.

18. The method of claim 16, wherein the rotational interface is further configured to have two states, wherein the two states include:
   a home state in which there is a first distance between the conductor region and the first set of coupling electrodes; and
   a compressed state in which there is a second distance between the conductor region and the first set of coupling electrodes, wherein the second distance less than the first distance; and
   wherein the method further comprises: determining whether the rotational interface is in the home state or in the compressed state based, at least in part, on a strength of the reference signal.

19. The method of claim 16, wherein the patterned region includes N tracks, and wherein receiving the one or more resulting signals includes receiving M resulting signals on each of M respective second electrode(s) of the input device, each track of the patterned region being coupled to one or more of the M second electrode(s), where N and M are each integers greater than zero.

* * * * *